(12) United States Patent
Hutcheson et al.

(10) Patent No.: US 7,447,998 B2
(45) Date of Patent: Nov. 4, 2008

(54) GRAPHICAL INTERFACE FOR TREE VIEW

(75) Inventors: Tracy Hutcheson, Morgan Hill, CA (US); Michael Wei Mao, San Jose, CA (US); Debra Lee Mayhew, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 11/381,673

(22) Filed: May 4, 2006

(65) Prior Publication Data

US 2007/0261007 A1   Nov. 8, 2007

(51) Int. Cl.
*G06F 3/048* (2006.01)
(52) U.S. Cl. .................. 715/777; 715/782; 715/852
(58) Field of Classification Search .............. 715/777, 715/782, 853, 786
See application file for complete search history.

(56) References Cited

U.S. PATENT DOCUMENTS

| | | | |
|---|---|---|---|
| 5,428,730 A | 6/1995 | Baker et al. | |
| 5,590,250 A | 12/1996 | Lamping et al. | |
| 5,751,287 A | 5/1998 | Hahn et al. | |
| 5,786,820 A * | 7/1998 | Robertson | 715/853 |
| 5,887,193 A | 3/1999 | Takahashi et al. | |
| 6,765,597 B2 | 7/2004 | Barksdale et al. | |
| 6,941,276 B2 | 9/2005 | Haeberli | |
| 7,139,982 B2 * | 11/2006 | Card et al. | 715/786 |

* cited by examiner

*Primary Examiner*—Ba Huynh
*Assistant Examiner*—Shashi K Becker
(74) *Attorney, Agent, or Firm*—Janet M. Skafar; Ingrid M. Foerster; Christine H. Smith

(57) ABSTRACT

Various embodiments of a computer-implemented method, system and computer program product provide a graphical interface. At least one tab is presented on a display. The tab comprises one or more child objects of a parent object of a hierarchy of objects. The tab has a three-dimensional effect. The tab has an apparent bend into the display. The apparent bend into the display increases as a depth of the one or more child objects of the hierarchy increases.

17 Claims, 6 Drawing Sheets

GRAPHICAL INTERFACE FOR TREE VIEW

BACKGROUND OF THE INVENTION 1.0 Field of the Invention

This invention relates to a graphical interface; and in particular, this invention relates to a graphical interface for a tree view.

2.0 Description of the Related Art

Computer systems typically store files in folders which are organized in a hierarchy in which the folders have a parent-child relationship. The hierarchy of folders may also be referred to as a tree. For example, in one operating system, files are organized in folders, and folders may contain other folders to form a hierarchy of folders. A folder which contains other folders is referred to as a parent folder, and the other folders are referred to as child folders of the parent folder. A folder may be both a parent folder and a child folder. Using a conventional technique to display the hierarchy or tree using a two dimensional view with linked lines to show relationships, it may be difficult to visually identify a parent-child relationship among the folders. This situation is aggravated with greater complexity of the parent-child relationships, especially as the number of children and sub-children increases. Therefore, there is a need for an improved technique to a display a hierarchy of folders.

SUMMARY OF THE INVENTION

To overcome the limitations in the prior art described above, and to overcome other limitations that will become apparent upon reading and understanding the present specification, various embodiments of a computer-implemented method, system and computer program product provide a graphical interface. At least one tab is presented on a display. The tab comprises one or more child objects of a parent object of a hierarchy of objects. The tab has a three-dimensional effect. The tab has an apparent bend into the display. The apparent bend into the display increases as a depth of the one or more child objects of the hierarchy increases.

In this way, various embodiments provide a graphical interface which displays a tree view of a hierarchy of objects using a three-dimensional effect.

BRIEF DESCRIPTION OF THE DRAWINGS

The teachings of the present invention can be readily understood by considering the following description in conjunction with the accompanying drawings, in which.

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to provide a graphical interface. Various embodiments of a computer-implemented method, system and computer program product are provided which present at least one tab on a display. The tab comprises one or more child objects of a parent object of a hierarchy of objects. The tab has a three-dimensional effect. The tab has an apparent bend into the display. The apparent bend into the display increases as a depth of the one or more child objects of the hierarchy increases.

A tree refers to a hierarchy of objects, that is, objects which are organized in a hierarchy. In some embodiments, an object may be a folder or a file. In other embodiments, an object may be a directory. A parent object contains one or more other objects, that is, child objects. Some objects, such as a folder, may be both a child object and a parent object. A tree description describes and comprises the hierarchy of objects.

Figure 1:
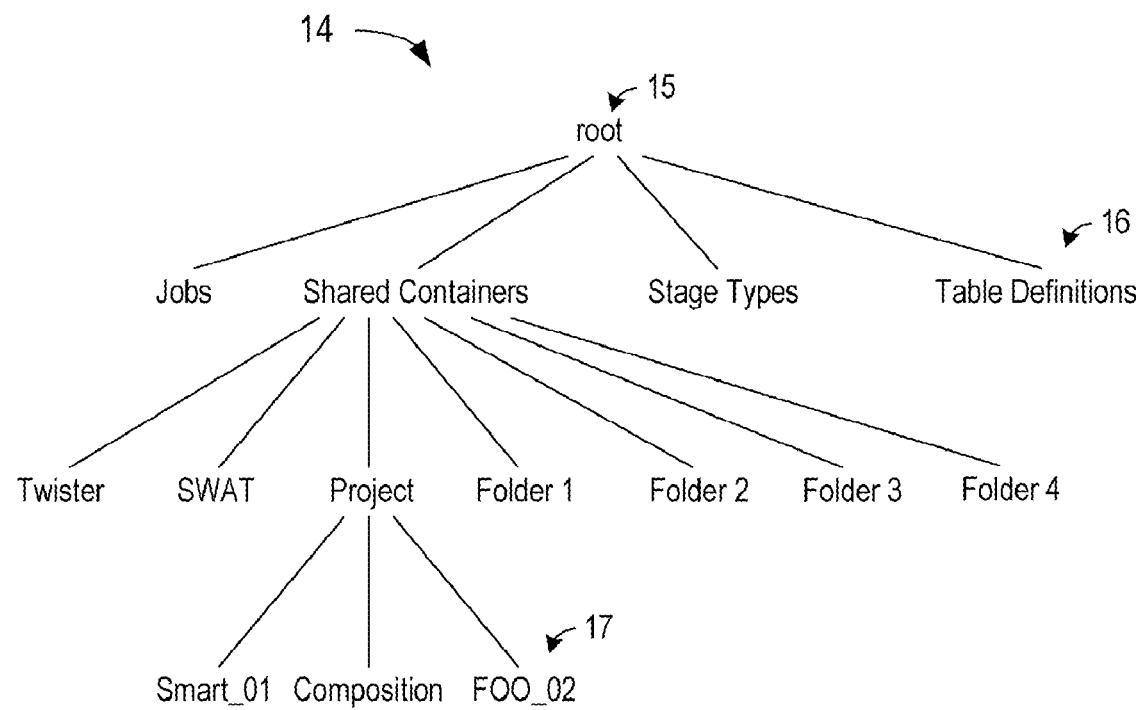
FIG. 1 depicts an exemplary hierarchy of objects.

FIG. 1 depicts an exemplary hierarchy of objects or tree 14. In FIG. 1, the objects comprise folders and files. A "root" folder 15 contains, and is the parent of, folders 16 called "Jobs", "Shared Containers", "Stage Types" and "Table Definitions." The "Shared Containers" folder contains, and is the parent of, folders called "Twister", "SWAT", "Project", "Folder 1", "Folder 2", "Folder 3" and "Folder 4". The "Project" folder contains, and is the parent folder of, files 17 called "Smart_01", "Composition" and "FOO_02".

An object is not meant to be limited to folders and files, and an object may be a data structure which can have a parent-child relationship. In various embodiments, the graphical interface provides a view of a tree which more clearly presents the parent-child relationship among objects of the tree to a user.

Figure 2:
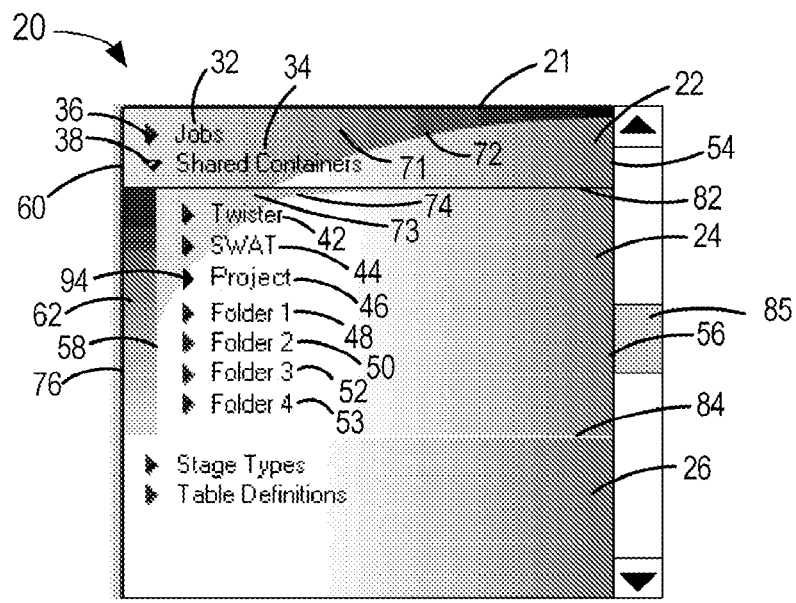
FIG. 2 depicts an embodiment of a graphical interface having a tree view of a portion of the exemplary hierarchy of objects of FIG. 1.

FIG. 2 depicts an embodiment of a graphical interface 20 having a tree view of a portion of an exemplary hierarchy of objects of FIG. 1. The graphical interface 20 is presented, that is, displayed, on a display. Typically, the graphical interface 20 is presented on a planar surface of the display. As shown in FIG. 2, the graphical interface has a display area 21 in which an exemplary portion of a hierarchy of objects is presented using the first, second and third tabs, 22, 24 and 26, respectively.

The first tab 22 is associated with a top object, which in some embodiments, is a root object such as a root folder or a root directory. Alternately, the top object is a predefined or a user-selected object. The first tab 22 displays one or more child objects 32 and 34 of the top object. As illustrated in FIG. 2, the child objects 32 and 34 are the folders which are called "Jobs" and "Shared Containers", respectively, of FIG. 1. Each child object, 32 and 34, is associated with a glyph, 36 and 38, respectively. The "Jobs" object 32 is not selected and the glyph 36 which is associated with the "Jobs" object 32 points to the right. The "Shared Containers" object 34 is selected; the glyph 38 which is associated with the "Shared Containers" object 34 points down, rather than to the right.

The first tab 22 is displayed such that at least a portion of the first tab 22 has a three-dimensional effect such that the first tab 22 has an apparent bend into the display. That is, the first tab 22 has an apparent bend away from a user looking at the graphical interface 20 on a display. The term "apparent bend" refers to a three-dimensional appearance of a bend of the tab that is presented on a two-dimensional display. In some embodiments, the first tab does not have an apparent bend.

The second tab 24 displays the child objects, "Twister", "SWAT", "Project", "Folder 1", "Folder 2", "Folder 3" and "Folder 4", 42, 44, 46, 48, 50, 52 and 53, respectively, of the "Shared Containers" object 34. The first and second tabs 22 and 24, respectively, are adjacent and arranged vertically.

To increase the visibility of the parent-child relationship of the child objects 42, 44, 46, 48, 50, 52 and 53, the second tab 24 is displayed such that at least a portion of the second tab 24 has a three-dimensional effect such that the second tab 24 has an apparent bend into the display. The apparent bend of the second tab 24 is greater than the apparent bend of the first tab 22.

In various embodiments, the indentation of a tab increases as the depth of the child objects of the tree hierarchy which are displayed on the tab increases. A first end, 54 and 56, of the first and second tabs 22 and 24, respectively, is fixed and aligned along a vertical axis. A second end 58 of the second tab 24 is indented with respect to a second end 60 of the first tab 22 and forms an indentation area 62. The second tab 24 has an apparent bend such that the second end 58 of the second tab 24 appears to be further into the display than the second end 60 of the first tab 22. The second end 58 of the second tab 24 also appears to be further into the display than the first end 56 of the second tab 24.

A shadow is applied to the first and second tabs, 22 and 24, respectively. The shadow causes the first and second tabs, 22 and 24, respectively, at least in part, to manifest the apparent bend into the display. The first tab 22 has a shadow area 71 with a shadow edge 72, and the shadow area 71 is shaded. As shown in FIG. 2, the shadow area 71 is gradually shaded in a continuous, or substantially continuous, manner from dark at the first end 54 to light at the second end 60. In some embodiments, the shadow area 71 of the first tab 22 is shaded uniformly. The shadow edge 72 is curved. The curvature of the shadow edge 72 is described in further detail below with reference to FIG. 8. In other embodiments, a shadow may not be applied to the first tab 22.

A shadow is defined on the second tab by shading the shadow area 73 of the second tab 24 above the shadow edge 74. In some embodiments, the shading of the shadow area 73 is uniform. In other embodiments, the shading of the shadow area 73 is graduated from light at the second end 58 of the second tab 24 to darker towards the first end 56 of the second tab 24. In this way, in various embodiments, the first tab 22 appears to be casting a shadow on a portion of the second tab 22. The shadow edge 74 is curved. Various embodiments of the curvature of the shadow edge 74 are described in further detail below with reference to FIG. 8.

As shown in FIG. 2, apparent bend of the second tab 24 into the display is greater than the apparent bend of the first tab 22. The amount of the apparent bend increases from the first end 56 to the second end 58 of the second tab 24. In other embodiments, the surface of the tabs appears to be flat.

The third tab 26 identifies additional child objects of the top object. Because the third tab 26 contains sibling objects of the objects of the first tab 22, the third tab 26 is displayed such that it appears to be in front of the second tab 24. In addition, the third tab 26 has the same apparent bend as the first tab 22. Because the third tab 26 is in front of the second tab 24, the third tab 26 does not have a shadow and associated shadow edge.

To further enhance the three-dimensional effect, the bottom edge of the first tab 22 is a dark line 82, and the top edge of the third tab 26 is a lighter, in some embodiments, a white, line 84. In this way, light appears to be blocked from shining on the bottom edge of the first tab 22, and light appears to be shining on the top edge of the third tab 26. Therefore, the appearance that the second tab 24 is further bent into the display than the first tab 22 and the third tab 26 is enhanced. In addition, in some embodiments, color can also be applied to the edges of the tabs to enhance the appearance that the second tab 24 is further bent into the display than the first tab 22 and the third tab 26.

In various embodiments, an additional effect is applied to the first, second and third tabs, 22, 24 and 26, respectively. A color, or in some embodiments, grey, is also applied to each tab 22, 24 and 26. In some embodiments, the color or grey is uniform. In other embodiments, as illustrated in FIG. 2, the color, or grey, is graduated from dark at the fixed end of the tabs horizontally across the display area 21. In some embodiments, the color, or grey, is also graduated vertically from darker at the top of the display area 21 to lighter at the bottom of the display area 21.

In some embodiments, the indentation area 62 is gray. In other embodiments, a color is applied to the indentation area 62. In some embodiments, a graduated shading is applied to the indentation area 62 such that the top of the indentation area 62 has a darker shading than the bottom of the indentation area 62. In other embodiments, a gradient is applied to the indentation area 62 such that the color of the top of the indentation area 62 is gradually changed to another color at the bottom of the indentation area 62.

In some embodiments, a scrollbar 85 allows a user to scroll the tabs on the display. For example, if the number of child objects on a tab is such that not all the child objects can be displayed in the display area 21, the scrollbar 85 can be used.

Figure 3:
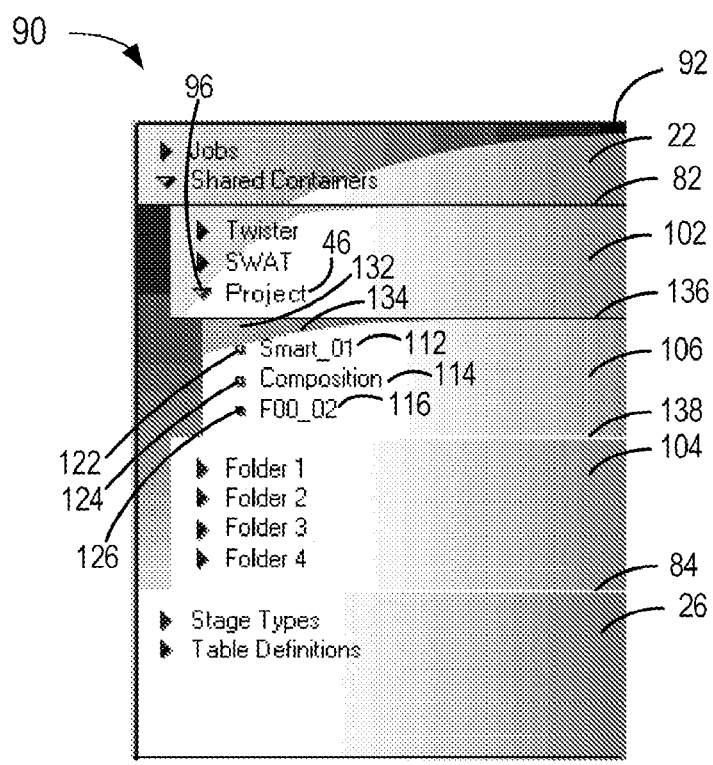
FIG. 3 depicts an embodiment of a graphical interface of a tree view illustrating child objects of a child object of the tree view of FIG. 2.

FIG. 3 depicts an embodiment of a graphical interface 90 of a tree view illustrating child objects of a child object of the tree view FIG. 2. The graphical interface 90 has a display area 92 comprising tabs. The first tab 22 and the third tab 26 are the same as in FIG. 2.

In response to a user selecting the "Project" object 46 of FIG. 2, the second tab 24 of FIG. 2 is split, to provide a fourth tab 102 and a fifth tab 104; and, a sixth tab 106 is presented with the child objects of the "Project" object 46. The sixth tab 106 is between the fourth tab 102 and the fifth tab 104. A user may select an object using any well-known technique, such as clicking on the object 46 with a mouse, clicking on the glyph 94 (FIG. 2) with a mouse, using a keyboard or other techniques that are known or that may become known. In FIG. 3, in response to being selected the glyph 96 that is associated with the "Project" object 46 points down and has a white area.

The fourth tab 102 displays the child objects 42 and 44 of the second tab 22 of FIG. 2 that are above the "Project" object 46. The fifth tab 104 displays these child objects 48, 50, 52 and 53 which are below the "Project" object 46 of the second tab 24. The sixth tab 106 displays the child objects of the "Project" object 46. In this example, the child objects of the "Project" object 46 are "Smart_01" 112, "Composition" 114 and "FOO_02" 116. The glyphs 122, 124 and 126, that are associated with Smart_01", "Composition" and "FOO_02", respectively, are circles which indicate that these objects are files. In this example, a folder is represented with a different glyph from a file. In some embodiments, the glyph that is associated with a folder may have a different color from the glyph associated with a file. In other embodiments, the glyph is an icon representing a folder, or a particular type of folder, or a file, or a particular type of file. In yet other embodiments, a glyph is not used.

The sixth tab 106 is displayed so that it appears to be further bent into the display than the second tab 24, and has a greater indentation than the second tab 24. The apparent bend of the sixth tab 106 is greater than the apparent bend of the second tab 24.

The sixth tab 106 has a shadow 132 with a shadow edge 134. In FIG. 3, the curvature of the shadow edge 134 is as though the fourth tab 102 is blocking light from reaching the sixth tab 106.

The fifth tab 104 contains sibling objects of the objects which are displayed on the fourth tab. The fifth tab 104 is displayed such that it appears to be in front of the sixth tab 106. In addition, the fifth tab 104 has the same apparent bend as the fourth tab 102. In some embodiments, the fourth and fifth tabs 102 and 104, respectively, have the same apparent bend as the second tab 24 of FIG. 2.

To further enhance the three-dimensional effect, the bottom edge 82 of the first tab 22 is a dark line, and the bottom edge 136 of the fourth tab 102 is a dark line. The top edge 84 of the third tab 26 is a light, or white, line, and the top edge 138 of the fifth tab 104 is a light, or white, line.

In some embodiments, the brightness of the parent and child objects is different to further distinguish the parent and child objects. For example, in FIG. 3, the non-shadow area of the sixth tab 106 is brighter than the non-shadow area of the fourth tab 102 which contains the parent object of the child objects of the sixth tab 106.

In this way, in various embodiments, the parent-child relationship of the objects in the tree view is made more visually distinct by creating a visual effect of a third dimension. The apparent bend of the tabs into the display increases as the depth of the child objects of the hierarchy increases. In addition, the amount of indentation of a tab increases as the depth of the child objects of the hierarchy, which are displayed on that tab, increases.

Figure 4:
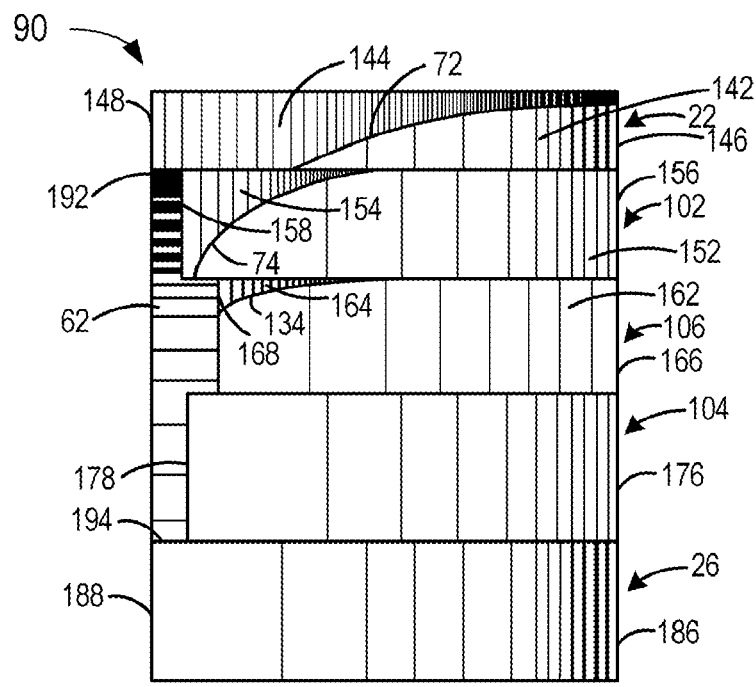
FIG. 4 depicts a diagram illustrating an embodiment of the shading of the graphical interface of FIG. 3.

FIG. 4 depicts a diagram illustrating an embodiment of the shading of the graphical interface 90 of FIG. 3. Lines illustrate the shading. Vertical lines illustrate the shading on the tabs 22, 102, 106, 104, and 26; and horizontal lines illustrate the shading in the indentation area 62. A wider line indicates a darker shading than a narrow line. In addition, shading is also represented by the spacing between the lines. The closer the lines are spaced from each other, the darker the shading. In some embodiments, the shading is applied as a continuous gradient; in other embodiments, the shading is applied in steps along a gradient.

The first tab 22 has a first-tab-non-shadow area 142 and a first-tab-shadow area 144 defined by the shadow edge 72 which is shown as a line in FIG. 4. The first-tab-shadow area 144 may also be referred to as a shadow. The first-tab-shadow area 144 is darker than the first-tab-non-shadow area 142. In the first-tab-shadow area 144 the shading at the first end 146 of the first tab 22 is darker than the shading at the second end 148 of the first tab 22. In various embodiments, the shading in the first-tab-shadow area 144 changes in a continuous manner, or alternately in steps. In the first-tab-non-shadow area 142 the shading at the first end 146 of the first tab 22 is darker than the shading nearer to the second end 148 of the first tab 22. In various embodiments, the shading in the first-tab-shadow area 144 changes in a continuous manner, or alternately in steps.

The fourth tab 102 displays child objects of one of the parent objects of the first tab 22, and appears to be bent further into the display than the first tab 22. The fourth tab 102 has a fourth-tab-non-shadow area 152 and a fourth-tab-shadow area 154 defined by the shadow edge 74. The fourth-tab-shadow area 154 is smaller than the first-tab-shadow area 144. The fourth-tab-shadow area 154 is darker than the fourth-tab-non-shadow area 152. The fourth-tab-non-shadow area 152 is brighter than the first-tab-non-shadow area 142. The shading of the fourth-tab-non-shadow area 152 is darker at a first end 156 of the fourth tab 102 and lighter towards the second end 158 of the fourth tab 102. The shading of the fourth-tab-shadow area 154 is darker towards the first end 156 of the fourth tab 102 and lighter at the second end 158 of the fourth tab 102.

The sixth tab 106 displays child objects of one of the parent objects of the fourth tab 102, and appears to be bent further into the display than the fourth tab 102. The sixth tab 106 has a sixth-tab-non-shadow area 162 and a sixth-tab-shadow area 164 defined by the shadow edge 132. The sixth-tab-shadow area 164 is smaller than the fourth-tab-shadow area 154. The sixth-tab-shadow area 164 is darker than the sixth-tab-non-shadow area 162. The sixth-tab-non-shadow area 162 is brighter than the fourth-tab-non-shadow area 152. The shading of the sixth-tab-non-shadow area 162 is darker at a first end 166 of the sixth tab 106 and lighter at the second end 168 of the sixth tab 102. The shading of the sixth-tab-shadow area 164 is darker towards the first end 166 of the sixth tab 106 and lighter at the second end 168 of the sixth tab 106.

The fifth tab 104 does not have a shadow area. The shading of the fifth tab 104 is similar to the shading of the fourth-tab-non-shadow area 152, and in some embodiments, is the same as the shading of the fourth-tab-non-shadow area 152.

The third tab 26 does not have a shadow area. The shading of the third tab 26 is similar to the shading of the first-tab-non-shadow area 142, and in some embodiments, is the same as the shading of the first-tab-non-shadow area 142.

The indentation area 62 has darker shading at a top end 192 which changes along a gradient to a lighter shading at a bottom end 194. In other embodiments, the color changes from a first color at the top end 192 to another color at the bottom end 194 along a gradient.

Figure 5:
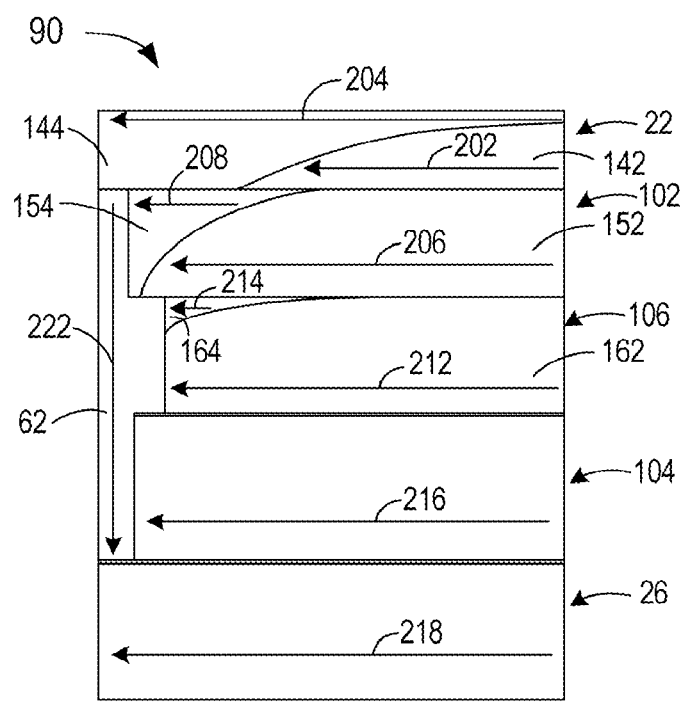
FIG. 5 depicts a diagram illustrating another embodiment of the shading of the graphical interface of FIG. 3.

FIG. 5 depicts a diagram illustrating another embodiment of the shading of the graphical interface 90 of FIG. 3. In the first tab 22, an arrow 202 indicates the direction of shading from dark to light in the first-tab-non-shadow area 142. Another arrow 204 indicates the direction of shading from dark to light in the first-tab-shadow area 144.

In the fourth tab 102, an arrow 206 indicates the direction of shading from dark to light in the fourth-tab-non-shadow area 152. Another arrow 208 indicates the direction of shading from dark to light in the fourth-tab-shadow area 154.

In the sixth tab 106, an arrow 212 indicates the direction of shading from dark to light in the sixth-tab-non-shadow area 162. Another arrow 214 indicates the direction of shading from dark to light in the sixth-tab-shadow area 164.

In the fifth tab 104, an arrow 216 indicates the direction of shading from dark to light. The fifth tab 104 does not have a shadow area.

In the third tab 26, an arrow 218 indicates the direction of shading from dark to light. The third tab 26 does not have a shadow area.

In the indentation area 62, an arrow 222 indicates the direction of shading from dark to light. In other embodiments, the color changes from a first color to another color in a gradient along the direction of arrow 222.

Figure 6A:
FIG. 6A depicts an illustrative top view of an embodiment of various tabs of FIG. 3 as though the tabs are physically embodied in three-dimensions.

FIG. 6A depicts an illustrative top view of an embodiment of various tabs of FIG. 3 as though the tabs are physically embodied in three-dimensions. The surface of the display is represented by dashed line 87. The exterior of the display is below dashed line 87, and the interior of the display is above dashed line 87. In this embodiment, the first, fourth and sixth tabs 22, 102 and 106, respectively, have a curved surface. The first tab 22 is bent into the display 87. The fourth tab 102 further bent into the display than the first tab 22. The sixth tab 106 is further bent into the display than the fourth tab 102.

Figure 6B:
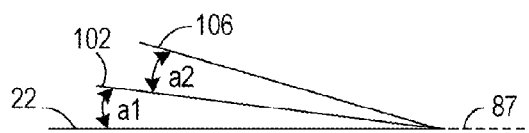
FIG. 6B depicts an illustrative top view of another embodiment of various tabs of FIG. 3 as though the tabs are physically embodied in three-dimensions.

FIG. 6B depicts an illustrative top view of an alternate embodiment of various tabs of FIG. 3 as though the tabs are physically embodied in three-dimensions. The first tab 22 is shown at the surface of the display 87. In this embodiment, the surfaces of the first tab 22, fourth tab 102 and the sixth tab 106 are substantially flat. The fourth tab 102 is behind, and at an angle a1 from, the first tab 22. The sixth tab 106 is behind, and at an angle a2 from, the fourth tab 102.

Figure 7:
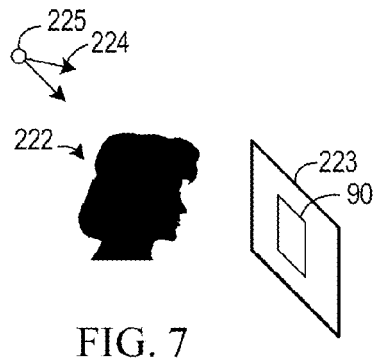
FIG. 7 depicts an illustration of a user looking at an embodiment of the graphical interface of FIG. 3 on a display.

FIG. 7 depicts an illustration of a user 222 looking at an embodiment of the graphical interface 90 of FIG. 3 on a display 223. In various embodiments, the shading of the tabs 22, 102, 106, 104 and 26 of FIG. 3 is as though light 224 is directed towards the tabs from a source 225 which is above the top of the display 20, from up left and behind the user 222.

Figure 8:
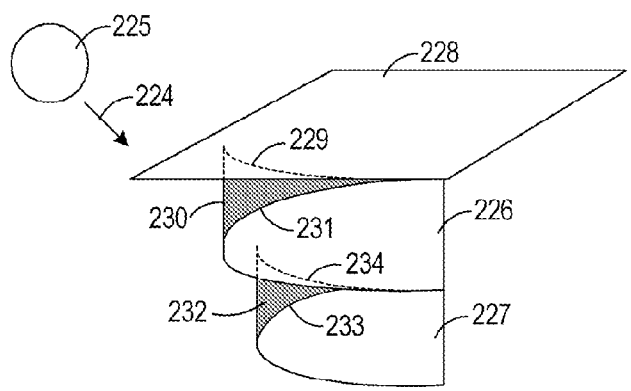
FIG. 8 depicts an illustration of the formation of shadows on tabs as though the tabs are physically embodied in three-dimensions.

FIG. 8 depicts an illustration of the formation of the shadows and shadow edges on the tabs as though the tabs are physically embodied in three-dimensions. An upper tab 226 and a lower tab 227 are shown. A light-blocking cover 228 is disposed between the light source 225 and the upper and lower tabs, 226 and 227, respectively. The light-blocking cover 228 blocks all or a portion of the light 224 from reaching the upper and lower tabs, 226 and 227, respectively. The dashed line 229 illustrates the portion of the upper tab 226 that is below the light-blocking cover 228. The dashed line 229 also illustrates the bend of the upper tab 226. Because the light-blocking cover 228 blocks the light 224 from reaching a portion of the upper tab 226, a shadow 230 is formed. The shadow 230 has a shadow edge 231. In this example, because the edge of the light-blocking cover is a straight line and because the upper tab 226 is bent, the shadow edge 231 is curved. The shape of the shadow 230 and the shadow edge 231 depends on the shape of the upper tab 226, the shape of the edge of the light-blocking cover 228, the position of the light-blocking cover over the tab and the position of the light source 225.

In this illustration, the lower tab 227 is positioned such that the upper tab 226 blocks the light 224 from reaching the lower tab 227, and a shadow 232 is formed on the lower tab 227 with a curved shadow edge 233. A dashed line 234 illustrates the portion of the lower tab 227 that is blocked from view by the upper tab 226. In other embodiments, the shape of the shadow 232 and the shadow edge 233 on the lower tab 227 depends on the shape of the lower tab 227, the shape of the upper tab 226, the amount of light 224 blocked by the upper tab 226, the shape of the edge of the light-blocking cover 228, the position of the light-blocking cover 228 over the tabs 226 and 228, and the position of the light source 225.

In some embodiments, some portions of the light-blocking cover 228 allow more light to pass through than other portions of the light-blocking cover 228. In various embodiments, when the tabs are presented, the light-blocking cover is not displayed as part of the graphical interface.

Various embodiments have been described in which the tabs are fixed and aligned at a right edge and are indented at a left edge.

Figure 9:
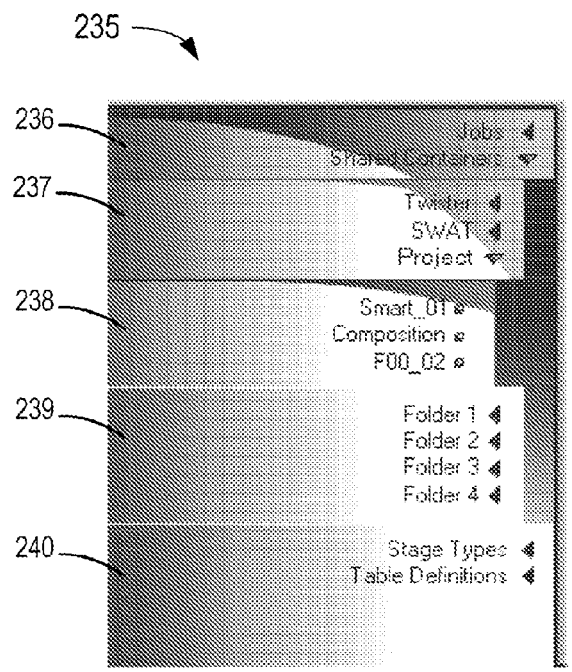
FIG. 9 depicts another embodiment of a graphical interface displaying the exemplary hierarchy of objects of FIG. 1.

FIG. 9 depicts another embodiment of a graphical interface 235 of displaying the exemplary hierarchy of objects of FIG. 1. In this embodiment, the tabs of FIG. 3 are rotated horizontally. The tabs 236, 237, 238, 239 and 240, are fixed and aligned at a left edge and indented at the right; therefore, the indentation area is on the right side of the graphical interface. The shadows and shading are also reversed.

In another embodiment, the tabs hang vertically from a top edge and the indentation area is at the bottom. In yet another embodiment, the tabs are aligned at a bottom edge and the indentation area is at the top.

Figure 10:
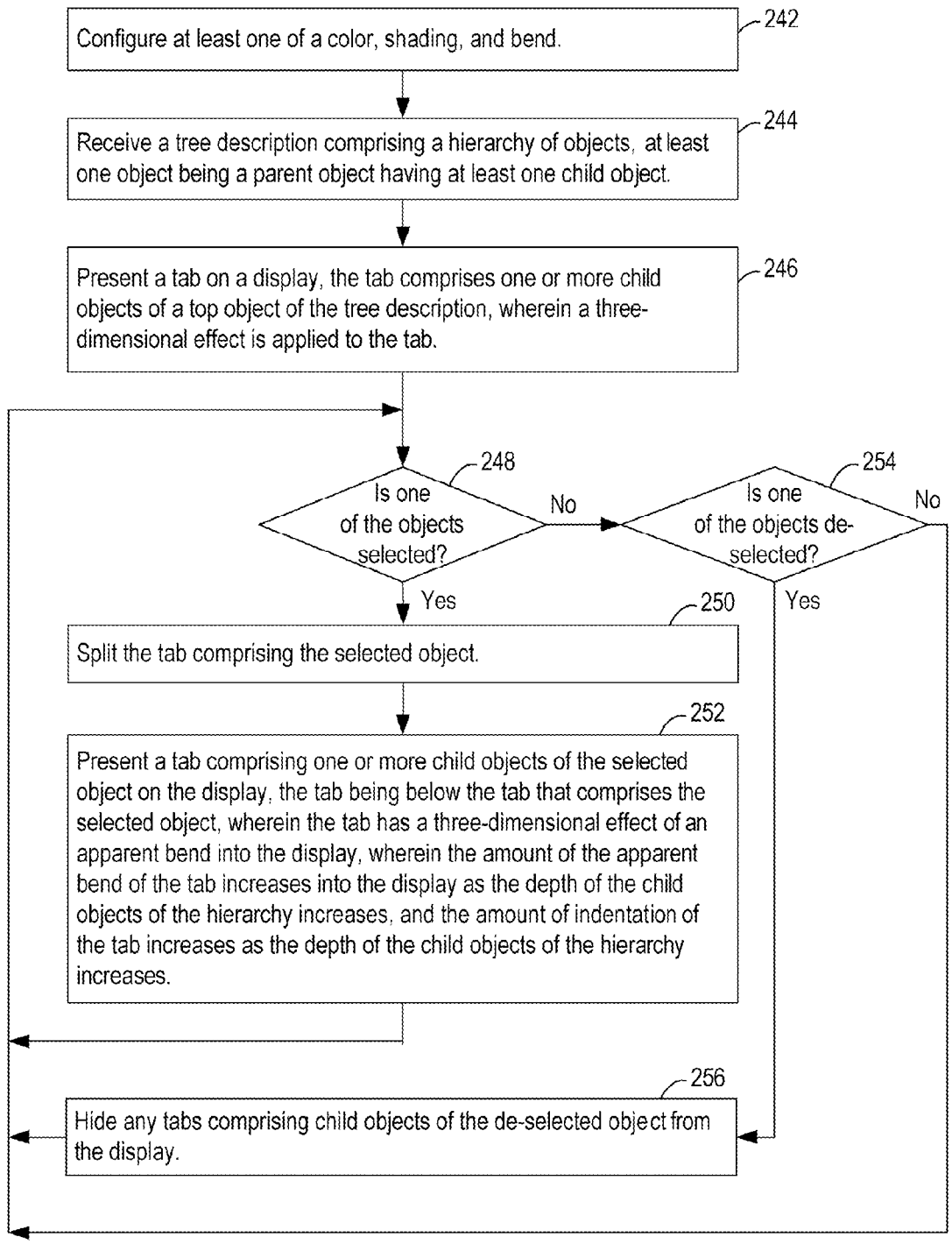
FIG. 10 depicts a flowchart of an embodiment of generating the graphical interface of the tree view of the present invention.

FIG. 10 depicts a flowchart of an embodiment of generating the graphical interface of a tree view of the present invention. For example, the flowchart of FIG. 10 may be used to generate the graphical interface of FIGS. 2 and 3.

In step 242, at least one of a color, shading and bend are configured. In various embodiments, a user provides parameters which are used to configure at least one of the color, shading and bend. In some embodiments, step 244 is omitted, and default colors, shading and bend are used.

In step 244, a tree description comprising a hierarchy of objects is received. At least one object is a parent object having at least one child object.

In step 246, a tab is presented on a display. The tab comprises one or more child objects of a top object of the tree description. A three-dimensional effect is applied to the tab. In some embodiments, the three-dimensional effect comprises a shadow. In some embodiments, the top object is a root object of the tree. In other embodiments, the top object is different from the root object of the tree, and may be selected by a user or selected dynamically by a computer program.

Step 248 determines whether one of the objects is selected. An object may be selected using any of the techniques described above.

In response to step 248 determining that one of the objects is selected, in step 250, the tab comprising the selected object is split. In various embodiments, the tab is split below the selected object. In some embodiments, a glyph associated with the selected object is also adjusted, for example, to point down rather than to the right. In some embodiments, step 248 is omitted, for example, when the selected object is a bottom object of a tab, and a glyph associated with that tab is adjusted.

In step 252, a tab comprising one or more child objects of the selected object is presented on the display. The tab is presented below the tab that comprises the selected object. In various embodiments, the tab comprising one or more child objects of the selected object is presented below the portion of the tab that is split which contains the selected object. The tab has a three-dimensional effect of an apparent bend into the display, wherein the amount of the apparent bend of the tab increases into the display as the depth of the child objects of the hierarchy increases, and the amount of indentation of the tab increases as the depth of the child objects of the hierarchy increases. In various embodiments, additional visual effects are applied to the tab and to the indentation area as described above with reference to FIGS. 2, 3, 4 and 5. Step 252 proceeds to step 248. The portion of the tab that is split that contains the selected object will be referred to as a parent tab. The portion of the tab that is split that does not contain the selected object will be referred to as a sibling tab. The tab comprising one or more child objects of the selected object will be referred to as a child tab. In various embodiments, the child tab is presented underneath the parent tab. In some embodiments, at least a portion of the child tab that is presented underneath the parent tab is blocked from view by the parent tab. In other embodiments, at least a portion of the child tab that is presented underneath the parent object is not blocked from view by the parent tab. In various embodiments, the child tab is presented such that the sibling tab appears to be in front of the child tab. In some embodiments, the sibling tab blocks a portion of the child tab from view. In other embodiments, the sibling tab does not block a portion of the child tab from view. In an alternate embodiment, in step 250, the tab is split above the selected object, and in step 252, the child tab is presented above the parent tab.

In response to step 248 determining that one of the objects is not selected, step 254 determines whether one of the objects is de-selected. An object may be de-selected using any well-known technique, such as clicking on the object using a mouse, clicking on the glyph that is associated with the object using a mouse, using a keyboard command, or any technique that is known or that may become known.

In response to step 254 determining that one of the objects is de-selected, in step 256, any tabs comprising child objects of the object that is de-selected are hidden, that is, are no longer displayed. In various embodiments, the objects of the parent tab and the sibling tab are presented on a single tab. In some embodiments, the glyph associated with the de-selected object is also adjusted, for example, to point to the right rather than pointing down. For example, in response to the "Project" object 46 of FIG. 2 being de-selected, the graphical interface of FIG. 2 is presented or displayed. Step 256 proceeds to step 248.

In response to step 254 determining that one of the objects is not de-selected, step 254 proceeds to step 248.

Figure 11:
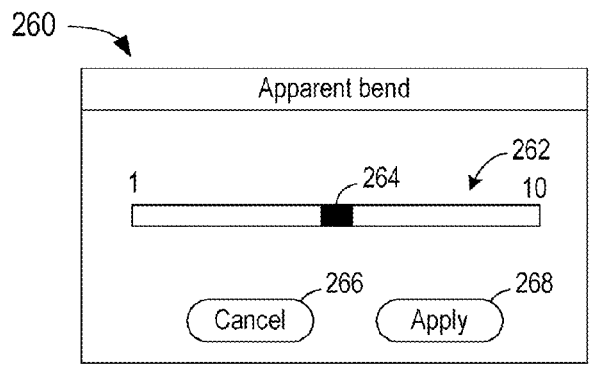
FIG. 11 depicts a diagram of an embodiment of a window to allow a user to adjust the apparent bend of the tabs of the graphical interface of FIGS. 2, 3 and 8.

FIG. 11 depicts a diagram of an embodiment of a window 260 to allow a user to adjust the apparent bend of the tabs of the graphical interface of FIGS. 2, 3, and 8. A slide 262 allows the apparent bend to be adjusted from a minimum "1" to a maximum "10". The user positions a slider 264 on the slide to select a desired apparent bend. The user may use a mouse to position the slider 264. In response to activating the "Cancel" button 266, the window 260 is no longer displayed and the apparent bend is unchanged. In response to activating the "Apply" button 268, the apparent bend of the tabs is presented in accordance with the slider position. A value representing the amount of apparent bend that is selected on the slider is also stored in an apparent bend parameter. The curvature of the tabs and the shadow are adjusted in accordance with the apparent bend parameter. A choice of "1" presents tabs with a smaller amount of apparent bend than a choice of "10".

Various embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, various embodiments of the invention can take the form of a computer program product accessible from a computer usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital video disk (DVD).

Figure 12:
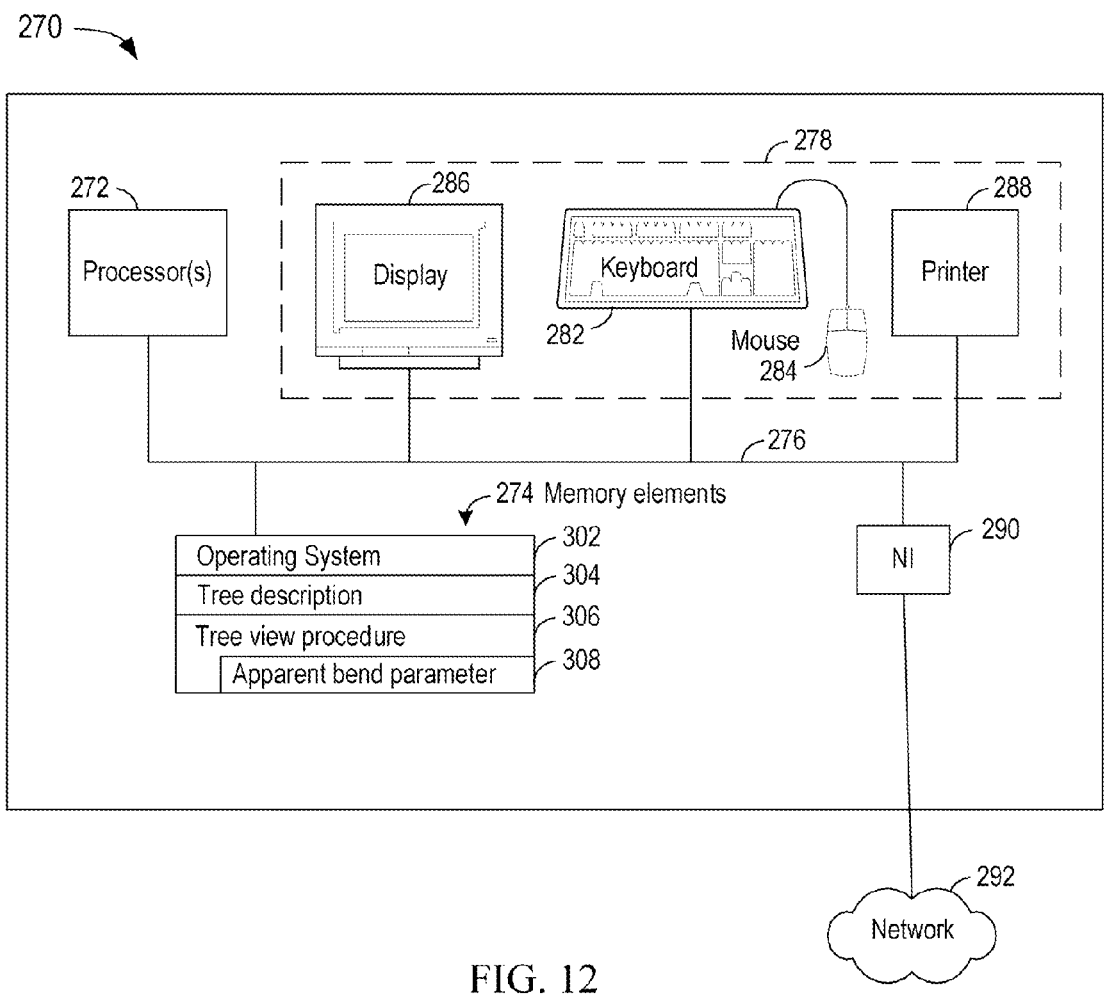
FIG. 12 depicts an illustrative data processing system which uses various embodiments of the present invention.

FIG. 12 depicts an illustrative data processing system 270 which uses various embodiments of the present invention. The data processing system 270 suitable for storing and/or executing program code will include at least one processor 272 coupled directly or indirectly to memory elements 274 through a system bus 276. The memory elements 274 can include local memory employed during actual execution of the program code, bulk storage, and cache memories which provide temporary storage of at least some program code in order to reduce the number of times code must be retrieved from bulk storage during execution.

Input/output or I/O devices 278 (including but not limited to, for example, a keyboard 282, pointing device such as a mouse 284, a display 286, printer 288, etc.) can be coupled to the system bus 276 either directly or through intervening I/O controllers.

Network adapters, such as a network interface (NI) 290, may also be coupled to the system bus 276 to enable the data processing system to become coupled to other data processing systems or remote printers or storage devices through intervening private or public networks 292. Modems, cable modem and Ethernet cards are just a few of the currently available types of network adapters. The network adapter may be coupled to the network via a network transmission line, for example twisted pair, coaxial cable or fiber optic cable, or a wireless interface that uses a wireless transmission medium. In addition, the software in which various embodiments are implemented may be accessible through the transmission medium, for example, from a server over the network.

The memory elements 274 store an operating system 302, a tree description 304 and a tree view procedure 306. In some embodiments, the tree view procedure 306 also has the apparent bend parameter 308. The tree description 302 comprises one or more data structures describing the hierarchy of objects. The tree view procedure 306 implements various embodiments of the flowchart of FIG. 10, and in some embodiments, the "Apparent bend" window 260 of FIG. 11. In some embodiments, the tree description 304 and tree view procedure 306 are part of the operating system 302. In other embodiments, the tree description 304 and tree view procedure 306 are part of an application. In yet another embodiment, the tree view procedure 304 is a stand-alone computer program.

The operating system 302 may be implemented by any conventional operating system such as z/OS® (Registered Trademark of International Business Machines Corporation), MVS® (Registered Trademark of International Business Machines Corporation), OS/390® (Registered Trademark of International Business Machines Corporation), AIX® (Registered Trademark of International Business Machines Corporation), UNIX® (UNIX is a registered trademark of the Open Group in the United States and other countries), WINDOWS® (Registered Trademark of Microsoft Corporation), LINUX® (Registered trademark of Linus Torvalds), Solaris® (Registered trademark of Sun Microsystems Inc.)

and HP-UX® (Registered trademark of Hewlett-Packard Development Company, L.P.).

The exemplary data processing system 270 that is illustrated in FIG. 12 is not intended to limit the present invention. Other alternative hardware environments may be used without departing from the scope of the present invention.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer-implemented method, comprising:
presenting at least one tab on a display, said tab comprising one or more child objects of a parent object of a hierarchy of objects, wherein said tab has a three-dimensional effect, such that said tab has an apparent bend into said display, wherein said apparent bend into said display increases as a depth of said one or more child objects of said hierarchy increases;
selecting one of said child objects; and
in response to said selecting, presenting another tab comprising one or more child objects of said selected object, wherein said another tab has said three-dimensional effect, such that an apparent bend of said another tab is greater than said apparent bend of said tab presenting said selected object, wherein said another tab is indented from said tab presenting said selected object, wherein said tab presenting said selected object and said another tab are aligned at another end.

2. The method of claim 1 wherein one end of said tab appears further into said display than another end of said tab.

3. The method of claim 1 wherein said at least one tab comprises a plurality of tabs aligned at one end.

4. The method of claim 1 wherein said apparent bend comprises a shadow on said tab.

5. The method of claim 4 wherein said shadow has a curved edge.

6. The method of claim 4 wherein said shadow has a graduated shading.

7. The method of claim 1 further comprising:
presenting an additional tab comprising one or more sibling objects of said child objects of said parent object, wherein a bottom edge of said tab presenting said child objects of said parent object is darker than a top edge of said additional tab.

8. A computer program product comprising a computer readable storage medium having a computer readable program, wherein the computer readable program when executed on a computer causes the computer to:
present at least one tab on a display, said tab comprising one or more child objects of a parent object of a hierarchy of objects, wherein said tab has a three-dimensional effect, such that said tab has an apparent bend into said display, wherein said apparent bend increases as a depth of said one or more child objects of said hierarchy increases;
receive a selected one of said child objects; and
present another tab comprising one or more child objects of said selected one of said child objects, wherein said another tab has said three-dimensional effect, such that an apparent bend of said another tab is greater than said apparent bend of said tab, wherein said another tab is indented from said tab at one end, wherein said tab and said another tab are aligned at another end.

9. The computer program product of claim 8 wherein one end of said tab appears further into said display than another end of said tab.

10. The computer program product of claim 9, wherein the computer readable program, when executed on the computer causes the computer to:
change said apparent bend of said tab.

11. The computer program product of claim 8, wherein the computer readable program, when executed on the computer causes the computer to:
present an additional tab comprising one or more sibling objects, respectively, of said child objects of said parent object.

12. The computer program product of claim 8 wherein said apparent bend comprises a shadow on said tab.

13. The computer program product of claim 12 wherein said shadow has a curved edge.

14. A data processing system, comprising:
a tree description of a hierarchy of objects;
at least one tab that is presented on a display, said tab comprising one or more child objects of a parent object of said tree description, wherein said tab has a three-dimensional effect, such that said tab has an apparent bend into said display, wherein said apparent bend increases as a depth of said one or more child objects of said hierarchy increases;
one of said child objects being a selected object; and
another tab that is presented, said another tab comprising one or more child objects of said selected object, wherein said another tab has said three-dimensional effect, such that an apparent bend of said another tab is greater than said apparent bend of said tab displaying said selected object, wherein said another tab is indented from said tab displaying said selected object.

15. The data processing system of claim 14 wherein one end of said tab appears further into the display than another end of said tab.

16. The data processing system of claim 14 wherein said at least one tab comprises a plurality of tabs aligned at one end.

17. The data processing system of claim 14 wherein said apparent bend comprises a shadow having a curved edge.

* * * * *